(12) United States Patent
Yokoyama et al.

(10) Patent No.: US 7,732,494 B2
(45) Date of Patent: Jun. 8, 2010

(54) METHOD OF CONCENTRATING FINE PARTICLE DISPERSION AND METHOD OF RECOVERING FINE PARTICLE

(75) Inventors: Chiaki Yokoyama, Miyagi (JP); Hitoshi Kasai, Miyagi (JP); Eiji Sarashina, Miyagi (JP); Hiroshi Inomata, Miyagi (JP); Hachiro Nakanishi, Miyagi (JP)

(73) Assignee: Japan Science and Technology Agency, Saitama (JP)

( * ) Notice: Subject to any disclaimer, the term of this patent is extended or adjusted under 35 U.S.C. 154(b) by 726 days.

(21) Appl. No.: 10/548,407

(22) PCT Filed: Aug. 4, 2003

(86) PCT No.: PCT/JP03/09875

§ 371 (c)(1),
(2), (4) Date: Sep. 8, 2005

(87) PCT Pub. No.: WO2004/085030

PCT Pub. Date: Oct. 7, 2004

(65) Prior Publication Data

US 2006/0107793 A1 May 25, 2006

(30) Foreign Application Priority Data

Mar. 27, 2003 (JP) ............................. 2003-086924

(51) Int. Cl.
*B01F 3/12* (2006.01)
*B22F 9/00* (2006.01)
(52) U.S. Cl. ........................................ 516/31; 75/370
(58) Field of Classification Search .................. 516/31; 57/370

See application file for complete search history.

(56) References Cited

U.S. PATENT DOCUMENTS 5,683,574 A * 11/1997 Mazgarov et al. ........... 208/206
6,339,182 B1 * 1/2002 Munson et al. ............. 585/809

FOREIGN PATENT DOCUMENTS

WO    WO 0234863 A1 *  5/2002

OTHER PUBLICATIONS

T. Welton. Room-Temperature Ionic Liquids. Solvents for Synthesis and Catalysis. Chem Rev. 1999, 99., p. 2071-2083, Amer. Chem. Soc.
H. Sasaki. Environmetally Beginning Reaction Which Uses Organic Ionic Liquid as a Solvent. Chemical, vol. 55, No. 3, 2000, p. 66-67.
K. Nobuo. Development of New Ionic Liquid and their Solvating Characteristics. Japan Chemical Society, 78th Spring Annual Meeting, Abstract 1, Lecture 2A1 06.
L. A. Blanchard. High-Pressure Phase Behavior of Ionic Liquid/CO2 Systems. J. Phys. Chem. B 2001, 105, 2437-2444, Amer. Chem. Soc.

* cited by examiner

*Primary Examiner*—Ling-Siu Choi
*Assistant Examiner*—Chun-Cheng Wang
(74) *Attorney, Agent, or Firm*—Hahn & Voight PLLC; Roger C. Hahn

(57) ABSTRACT

A method for concentration of fine particles dispersed in a dispersion into an ionic liquid comprising, adding an ionic liquid, especially an organic ionic liquid at ordinary temperature, e.g., a salt of 1-butyl-3-methylimidazolium with $PF_6^-$ to a dilute dispersion of fine particles so as to concentrate the fine particles into the ionic liquid.

2 Claims, No Drawings

METHOD OF CONCENTRATING FINE PARTICLE DISPERSION AND METHOD OF RECOVERING FINE PARTICLE

FIELD OF THE INVENTION

The present invention relates to a method for concentration of fine particles prepared by adding an ionic liquid, which does not dissolve substantially in a dispersing medium, to a dilute dispersion of fine particles so as said fine particles to transfer to said ionic liquid and to obtain high concentrated dispersion of fine particles and a method for recovery of fine particles by filtration of the concentrated fine particles.

DESCRIPTION OF THE PRIOR ART

As the method for concentration or recovery of fine particles from a dispersion characterizing fine particles are dispersed in dilute condition in dispersing medium, a method to remove basically a liquid, which is a dispersing medium, by evaporation at atmospheric pressure, in vacuum, freezing or by adding azeotropic component or a method to remove liquid of dispersing medium by using a membrane filter can be mentioned. A technique that deems to use a membrane filter is announced in internet that said technique will be reported as "R316; Concentration of fine particles dispersion using vibrating filtration and size separation" (Shigetoshi Ichimura; Kanagawa Institute of Technique, Shinichi Nakao; Graduated school of Tokyo University, faculty of engineering) at SCEJ 68$^{th}$ Annual Meeting.

Problems of environmental contamination are paid attention in various fields, and accordingly, also in the field of chemistry, establishment of a method which is gentle to environment is becoming a key point that affect the existence of a firm.

Regarding said environmental problem, besides a subject not to exclude harmful substances from a chemical reaction system, it becomes necessary to consider to suppress formation of $CO_2$ in whole production system, because a regulation to suppress formation of $CO_2$ becomes more serious. Therefore, regarding a method to remove a dispersing solvent using large quantities of energy, for example, in a case that a dispersing solvent is water, since latent heat of evaporation is large, it is necessary to develop a method to concentrate or separate and recover fine particles from dispersing medium which can be replaced with water.

In above mentioned circumstances, in a chemical reaction, a solvent to be used has a function not only to control an explosive progress of a reaction of reagent, but also has a function to remove heat of reaction, further has a function to accomplish easy handling of the reagent. However, it is necessary to separate and remove said used solvent from reaction product after chemical reaction. At the separation and removal of said solvent, same problem causes at concentration of said fine particles dispersion, that is, how to remove and waste large quantity of solvent in the condition without a problem of environmental contamination.

Thereupon, as a solvent which can dissolve said problem, an ionic liquid is proposed (Thomas Welton, Chem. Rev. 1999, 99, page 2071-2083; Document 1, Hiroaki Sasaki, "Chemical" vol. 55, No. 3, 2000, page 66-67; Document 2). Said ionic liquid is aiming clean chemistry and has wide temperature region for maintaining its liquid state, has small volatility, can be a solvent for many reaction reagents and separation and recovery of a reaction product after reaction from it are easy. After said proposal, an ionic solvent composed of combination of anion and cation which can be a solvent usable for a specific reaction has been researched. In particular, a development of organic ionic liquid which exaggerates a function as a solvent by improvement of chemical structure of cation has been progressed actively (Japan Chemical Society, 78$^{th}$ Spring Annual Meeting, Abstract I, lecture 2A1 06 "Development of novel ionic liquid and properties thereof", 2000; Document 3).

As a typical organic ionic solvent, 1-alkylpridinium salt, 1-alkyl-3-methylimidazolium salt or ammonium salt represented by following formulae 1a, 1b and 1c can be mentioned as a useful compound or a compound having useful function.

formula 1 a.

b.

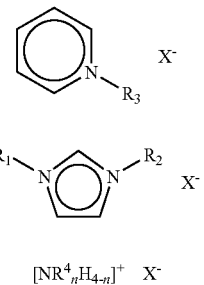

c.

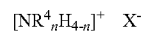

Wherein, $R_3$ is an alkyl group, in particular, hexyl group of carbon number 1-7, $R_1$ is an alkyl group, in particular, ethyl group, butyl group, benzyl group, $X^-$ is $PF_6^-$, $BF_4^-$, $NO_3^-$, $(CF_3SO_3)_2N^-$, $TFSI^-$, or $Cl^-$.

Cation and anion which form ionic liquid are developed in various ways (Document 1). In above mentioned developments, it is recognized that the combination with a counter ion is deeply related to properties of ionic liquid, especially to temperature region for maintaining its liquid state. Ionic liquid, which is also called as an ordinary temperature fused salt, has an onium salt possessing N, O, P or S as a main element as an organic cation. Besides said cation, compounds which are converted to cation by protonation of phosphonium, ammonium salt, 2-methyl-1-pyroline, 1-methylpyrazole or 1-ethylcarbazole can be mentioned.

However, the ionic liquid has also difficult problem. Vapor pressure of ionic liquid is almost zero, and in a case of reuse of it after used in reaction in the same way to a conventional organic solvent, separation of compound which dissolved in the ionic liquid becomes a problem. Considering said circumstance, a separation method combining supercritical $CO_2$ with ionic liquid is paid attention. Blanchard and Brennecke have reported that imidazolium ionic liquid can dissolve supercritical $CO_2$ by 0.6 mole fraction at 8 MPa and when added more the mixture separates to two phases. And are further reporting that since in the separated $CO_2$ phase the ionic liquid is not detected, the compound dissolved in the ionic liquid is recovered in the $CO_2$ phase (Blanchard, L. A., Gu, Z., Brennecke, J. F., J. Phhys. Chem. B, 2001, 105, 2437-2444: Document 4).

The subject of the present invention is to provide a method for concentration of dispersion in which fine particles are dispersed in dilute condition or recovery of said fine particles, removing above mentioned environmental problem and energy problem at concentration or recovery of fine particles. In the meanwhile, it is known that fine particles dispersed in dispersing medium have electric charge in dispersing medium.

Said ionic liquid is developed as a substitution of water which is broadly used as a reaction medium, it can be a solvent of a reaction reagent in reaction system, further, in some cases, is remarkably distinguished from water at a special feature that reaction material and reaction product can be easily separated and recovered after reaction, because solubility and function to a reaction reagent and a reaction product are different by chemical structure of cation and counter anion to be combined with it. Furthermore, it is possible to select a substance which is insoluble in a dispersing liquid such as water. Still further, it is considered that an ionic liquid has mutual action against electric charged component, and when the electric charged component is closed to the ionic liquid, it causes attracting strength formed by difference between attractive power against electron charge component of original dispersing medium and attractive power of the ionic liquid. Thereupon, salt of 1-butyl-3-methylimidazolium cation, which is a typical organic ionic liquid, and $PF_6^-$ is added to dispersion in which fine particles are dispersed in dilute condition and stirred, and it is found that the fine particles-are transferred from the dispersing medium to a liquid phase of organic ionic liquid and concentrated, thus the above mentioned subject is dissolved.

DISCLOSURE OF THE INVENTION

The present invention is (1) a method for concentration of fine particles dispersed in a dispersion comprising, adding an ionic liquid, which does not dissolve substantially a dispersing medium of said dispersion, to said dispersion containing fine particles, transferring said fine particles from said dispersion to said ionic liquid and concentrating said fine particles into said ionic liquid. Desirably, the present invention is (2) the method for concentration of fine particles dispersed in a dispersion of (1), wherein the amount of ionic liquid b mL to be added to 10 mL of the dispersion containing said fine particles by a mM dispersing concentration is in the range so as the ratio a/b to be at least 0.05. More desirably, the present invention is (3) the method for concentration of fine particles dispersed in a dispersion of (1) or (2), wherein the ionic liquid is an ionic liquid which is liquid at ordinary temperature. Further desirably, the present invention is (4) the method for concentration of fine particles dispersed in a dispersion of (3), wherein the ionic liquid is an organic ionic liquid. Furthermore desirably, the present invention is (5) the method for concentration of fine particles dispersed in a dispersion of (4), wherein the organic ionic liquid is selected from the group consisting of compounds represented by following formulae 1.

formulae 1 a.

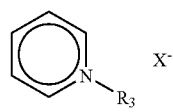

b.

c.

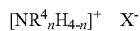

In formulae 1, $R_3$ and $R^4$ are an alkyl group of carbon number 1-7, n is an integer of 1-3, $R_1$ is an alkyl group which can possess a substitution group of carbon number 1-7, X⁻ is selected from the group consisting of $PF_6^-$, $BF_4^-$, $NO_3^-$, $(CF_3SO_3)_2N^-$, TFSI⁻, Cl⁻ and $SO_3H^-$.

DESCRIPTION OF THE PREFERRED EMBODIMENT

The present invention will be explained more in detail.
A. In the present invention, as an ionic liquid, public known ionic liquid can be basically used, however, considering a problem of energy consumption, an ionic liquid which maintains liquid state at ordinary condition is preferably used, further considering recovery process of fine particles after concentration, an ionic liquid of lower viscosity is preferably used, and when the viscosity is high, it is possible to add solvent such as ether for the purpose to reduce the viscosity, then filtrated.
As a desirable ionic liquid, compounds disclosed in above formulae 1 can be mentioned, and as the most desirable one, imidazolium organic ionic liquid represented by above formula 1 b can be mentioned.
B. In a case of aqueous dispersion of fine particles, regarding the amount of ionic liquid to be added b (mL), which is slightly affected by temperature of adding liquid and concentration of dispersion, at the range of dispersion concentration is over than 0.01 mM and at the temperature range of from ordinary temperature to 100° C., when the ratio a/b to fine particles content a (mL) in fine particles dispersing medium is 0.067 or more, the concentration of fine particles becomes possible, and smaller than 1 is desirable. However, in a case of not aqueous dispersion, this definition is not suited.
C. For the purpose to concentrate fine particles into ionic liquid, it is necessary to stir well after the ionic liquid is added.
D. After fine particles are concentrated in the ionic liquid, the ionic liquid can be separated by public known filter membrane, for example, which is disclosed in Japanese Patent Laid Open Publication 10-57784.
E. As the fine particles, which is subjected by the method for concentration of the present invention, is the particles whose particle size is from nano meter to several ten micro meter order, for example, the particles smaller than 20 micro meter, and not related to materials composing the particles, for example, can be applied to pigment, metal, semi-conductor, polymer or composite materials, or system containing plural components. This fact is considered to be caused by transferring of fine particles by ionic liquid, and concentrating action is caused by electric charge characteristic. However, this method can not be applied to a case which contains soluble material to an ionic liquid as a material composing the fine particles.
F. As a method to recover fine particles from the ionic liquid, a filtration method which uses above mentioned filtering membrane for fine particles can be considered. When the viscosity of the ionic liquid is high, it is possible to add adequate organic solvent so as to reduce the viscosity, then can be separated by filtration.

EXAMPLE

The present invention will be illustrated more in detail according to Reference Examples and Examples, however, not intending to limit the scope of the present invention.
In following Examples 1-6, a salt of 1-butyl-3-methylimidazolium, which is a typical organic ionic liquid, and $PF_6^-$ is used as an ionic liquid.

Observation of particles before and after dispersion is carried out by following method.
1. Observation of color change by visual inspection.
2. Observation of shape of particles; observed by an electron scanning microscope (Hitachi Seisakusho, S-900).

Example 1

Blue coloration aqueous dispersion containing 0.2 mM (conc. a mM) of various size of polydiacetylene fine particles (150 nm, 50 nm, 120 nm, 500 nm, fibrous particles of several 10 micrometer) are prepared by reprecipitation method using 1,6-di-(N-carbazoil)-2,4-hexadine (shortened to DCHD). After that, 10 mL of these dispersions are picked out into sampling bottles at room temperature and every 5-10 drops of ionic liquid (1 drop is approximately 0.01 mL) are added to each bottles as a coagulation promoter and mixed violently. This process is repeated. When smaller amount of the ionic liquid than 0.1 mL (adding amount of ionic liquid is b mL) is added, phase separation does not occur, on the contrary, when amount of 0.1 mL to 0.2 mL is added (a(mM)/b(mL), where 2.0>a/b>1.0), liquid drops of ionic liquid, which colored slightly blue, appears at the bottom of the bottle.

When more than 0.2 mL (a/b<1) of ionic liquid is added, color of original dispersion becomes colorless and transparent and fine particles of polydiacetylene are almost perfectly recovered in liquid drops of the ionic liquid. When the ionic liquid is further excessively added, size of the liquid drops becomes larger. Before and after this process, there are no change in shape of fine particles and photo absorption feature.

Since even if the particle size is changed, adding amount of the ionic liquid necessary for concentration is not changed, dependency of adding amount of ionic liquid to particle size is not recognized.

Example 2

Blue coloration aqueous dispersion containing various concentration (0.01 mM, 0.1 mM, 0.5 mM) of polyacetylene fine particles of approximately 100 nm are prepared by reprecipitation method using 1,6-di-(N-carbazoil)-2,4-hexadine (shortened to DCHD). After that, 10 mL of these dispersions are picked out into sampling bottles at room temperature and every 5-10 drops of ionic liquid (1 drop is approximately 0.01 mL) are added to each bottles as a coagulation promoter and mixed violently. This process is repeated. When more than 0.1 mL of ionic liquid is added, phase separation occurs and liquid drops of ionic liquid, which colored slightly blue, appear at the bottom of the bottles. As shown in Table 1, adding amounts necessary for perfect recovery of each concentration are different. Before and after the concentration process, there are no change in shape of fine particles and photo absorption feature.

TABLE 1

| a; conc. of dispersion/ mM | b; necessary adding amount of ionic liquid/mL | ratio: a mM/b mL |
|---|---|---|
| 0.01 | 0.15 | 0.067 |
| 0.1 | 0.2 | 0.5 |
| 0.5 | 0.5 | 1.0 |

Example 3

Yellow coloration aqueous dispersion prepared by making perylene nano particles (size is approximately 150 nm, fibrous particles of several micro meter) contain in 0.1 mM using reprecipitation method is prepared. 10 mL of the dispersion is picked out into sampling bottles and maintained in different temperature conditions (5° C., 18° C., 80° C.), then every 5-10 drops of an ionic liquid (1 drop is approximately 0.01 mL) are added to each bottles as a coagulation promoter and mixed violently. This process is repeated. Yellow colored liquid drops of the ionic liquid appear at the bottom of bottles. Necessary amounts of the ionic liquid that can confirm the occurrence of phase separation are different by each temperature, and have a tendency that the amount increases at higher temperature. Necessary adding amounts of ionic liquid for perfect recovery are summarized in Table 2. At 0.1 mM dispersion concentration, temperature: 5° C./necessary adding amount: 0.2 ml, temperature: 18° C./necessary adding amount: 0.25 ml, temperature: 80° C./necessary adding amount: 0.3 ml. Before and after the operation, there are no change in shape of fine particles and photo absorption feature.

TABLE 2

| | Conc. of dispersion = 0.1 mM | |
|---|---|---|
| temperature of dispersion/° C. | necessary adding amount of ionic liquid b (mL) | ratio: a mM/b mL |
| 5° C. | 0.2 | 0.5 |
| 18° C. | 0.25 | 0.4 |
| 80° C. | 0.3 | 0.33 |

Example 4

Colored aqueous dispersion prepared by making particles of cupper phthalocyanine (size: approximately 100 nm), quinacridone (size: approximately 100 nm), C60 (size: approximately 270 nm) or polystyrene (size: approximately 200 nm) contain in 0.1 mM using reprecipitation method is prepared. 10 mL of these dispersions are picked out into sampling bottles at room temperature and every 5-10 drops of an ionic liquid (1 drop is approximately 0.01 mL) are added to each bottles as a coagulation promoter and mixed violently. This process is repeated. In a case when more than 0.15 ml of ionic liquid is added, phase separation is caused and liquid drops of colored ionic liquid appear at the bottom of bottle. Necessary adding amount for perfect recovery to each dispersions are equally 0.2 ml as shown in Table 3. Before and after the operation, there are no change in shape of fine particles and photo absorption feature.

TABLE 3

| | Conc. of dispersion = 0.1 mM | | |
|---|---|---|---|
| dispersed material | size/nm | necessary adding amount of ionic liquid b (mL) | ratio: a mM/b mL |
| cupper phthalocyanine | 100 | 0.15-0.2 | 0.67-0.5 |
| quinacridone | 100 | 0.15-0.2 | 0.67-0.5 |
| fullerene $C_{60}$ | 270 | 0.15-0.2 | 0.67-0.5 |
| polystyrene | 200 | 0.15-0.2 | 0.67-0.5 |

Example 5

To 10 ml of colored aqueous dispersion prepared by making particles of silver (size: approximately 30 nm), gold (size: approximately 20 nm), cadmium sulfide (size: approximately 300 nm) or titanium dioxide (size: approximately 20 nm) contain in 2 mM at room temperature, every 5-10 drops of an ionic liquid (1 drop is approximately 0.01 ml) are added to each bottles as a coagulation promoter and mixed violently. This process is repeated. When more than 0.15 ml of the ionic liquid is added, phase separation is caused and liquid drops of colored ionic liquid appear at the bottom of bottle. Especially, in cases of fine particles of gold and silver, metallic luster is recognized. Necessary adding amount for perfect recovery to each dispersions are equally 0.2 ml as shown in Table 4. Before and after the operation, there are no change in shape of fine particles and photo absorption feature.

TABLE 4

Conc. of dispersion = 0.1 mM

| dispersed material | size/nm | necessary adding amount of ionic liquid b (mL) | ratio: a mM/b mL |
|---|---|---|---|
| silver | 30 | 0.15-0.2 | 0.67-0.5 |
| gold | 20 | 0.15-0.2 | 0.67-0.5 |
| CdS | 300 | 0.15-0.2 | 0.67-0.5 |
| TiO$_2$ | 20 | 0.15-0.2 | 0.67-0.5 |

Example 6

To 10 mL of cyclohexane dispersion in which 2.0 wt % of particles of polyimide (size: approximately 250 nm) is contained, every 5-10 drops of an ionic liquid (1 drop is approximately 0.01 ml) are added as a coagulation promoter and mixed violently at room temperature. When more than 0.15 ml of the ionic liquid is added, phase separation is caused and liquid drops of colored ionic liquid appear at the bottom of bottles. However, necessary adding amount for perfect recovery is approximately 1.5 mL and is larger when compared with an aqueous dispersion. Before and after the operation, there are no change in shape of fine particles and photo absorption feature.

INDUSTRIAL APPRICABILITY

As mentioned above, by use of ionic liquid, an excellent effect that fine particles contained in diluted dispersion can be effectively concentrated in the ionic liquid is provided, and has a bright feature as a concentration technique of industrial scale.

What is claim:

1. A method for recovering fine particles dispersed in an aqueous medium comprising, adding an ionic liquid, which does not dissolve substantially a dispersing aqueous medium, to the aqueous medium containing fine particles and transferring said fine particles from said aqueous medium to the ionic liquid, wherein the amount of the ionic liquid b mL to be added to 10 mL of the aqueous medium containing said fine particles by a mM dispersing concentration is in the range so as the ratio a/b is 0.05≦a/b<1.0, and wherein said ionic liquid is an organic ionic liquid selected from the group consisting of compounds represented by following formulae 1, formulae 1 a.

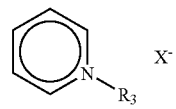

b.

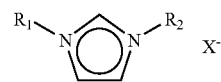

c.

wherein, $R_3$ and $R^4$ are an alkyl group of carbon number 1-7, n is an interger of 1-3, $R_1$ is an alkyl group which can possess a substitution group of carbon number 1-7, $X^-$ is selected from the group consisting of $NO_3^-$, $(CF_3SO_3)_2N^-$, $TFSI^-$, $Cl^-$ and $SO_3H^-$.

2. The method for recovering fine particles dispersed in the aqueous medium of claim 1, wherein the ionic liquid is an ionic liquid which is liquid at room temperature.

* * * * *